United States Patent
Kashchenko

(10) Patent No.: US 10,589,664 B2
(45) Date of Patent: Mar. 17, 2020

(54) SYSTEM AND METHOD FOR AUTOMATICALLY ACTIVATING TURN INDICATORS IN A VEHICLE

(71) Applicant: Stanislav D. Kashchenko, Moscow (RU)

(72) Inventor: Stanislav D. Kashchenko, Moscow (RU)

( * ) Notice: Subject to any disclaimer, the term of this patent is extended or adjusted under 35 U.S.C. 154(b) by 0 days.

(21) Appl. No.: 16/041,103

(22) Filed: Jul. 20, 2018

(65) Prior Publication Data

US 2019/0077308 A1     Mar. 14, 2019

Related U.S. Application Data

(63) Continuation-in-part of application No. 15/700,390, filed on Sep. 11, 2017, now Pat. No. 10,173,586.

(51) Int. Cl.
| | |
|---|---|
| *B60Q 1/34* | (2006.01) |
| *G06N 3/08* | (2006.01) |
| *G06F 3/01* | (2006.01) |
| *G06F 3/03* | (2006.01) |
| *G06K 9/00* | (2006.01) |
| G06K 9/62 | (2006.01) |

(52) U.S. Cl.
CPC ............ *B60Q 1/346* (2013.01); *G06F 3/012* (2013.01); *G06F 3/013* (2013.01); *G06F 3/0304* (2013.01); *G06K 9/00791* (2013.01); *G06N 3/08* (2013.01); *G06K 9/00597* (2013.01); *G06K 9/6267* (2013.01)

(58) Field of Classification Search
CPC ............................ B60Q 1/346; G06K 9/0221
See application file for complete search history.

(56) References Cited

U.S. PATENT DOCUMENTS

| | | | |
|---|---|---|---|
| 9,616,809 B1 | 4/2017 | Alasry | |
| 10,011,216 B1 * | 7/2018 | Rovik | ................ G06K 9/00845 |

(Continued)

OTHER PUBLICATIONS

Murphy-Chutorian, E., Trivedi, M.M.: "Head pose estimation in computer vision: A survey." IEEE Transactions on Pattern Analysis and Machine Intelligence; pp. 607-626 (2009); available at http://ieeexplore.ieee.org/document/4497208/.

*Primary Examiner* — Phung Nguyen

(74) *Attorney, Agent, or Firm* — Arent Fox LLP; Michael Fainberg

(57) ABSTRACT

Disclosed are systems and methods for activating turn indicators of a motor vehicle. The disclosed methods includes collecting, for a predetermined period of time, from a plurality of internal and externals sensors of the vehicle, information associated with a plurality of driving maneuvers performed by a driver of the vehicle, the collected information includes at least one of information about driver's behavior, vehicle condition, road condition or traffic condition; feeding the collected information into a neural network for training a plurality of rules that determine when to automatically activate turn indicators based at least on driver's behavior; applying one or more trained rules to predict the next vehicle maneuver by the driver; and automatically activating a turn indicator of the vehicle based on the application of the one or more rules before the next vehicle maneuver is performed by the driver.

18 Claims, 7 Drawing Sheets

(56) References Cited

U.S. PATENT DOCUMENTS

| | | | |
|---|---|---|---|
| 2005/0200467 A1* | 9/2005 | Au | B60Q 1/34 |
| | | | 340/465 |
| 2009/0009469 A1 | 1/2009 | Hsu et al. | |
| 2009/0069977 A1 | 3/2009 | Markyvech | |
| 2009/0174540 A1* | 7/2009 | Smith | B60Q 1/34 |
| | | | 340/465 |
| 2011/0010637 A1 | 1/2011 | Schneider | |
| 2011/0106376 A1 | 5/2011 | Tijerina | |
| 2012/0083960 A1* | 4/2012 | Zhu | G05D 1/0214 |
| | | | 701/23 |
| 2012/0089300 A1 | 4/2012 | Wolterman | |
| 2012/0271510 A1 | 10/2012 | Seymour | |
| 2018/0058873 A1 | 3/2018 | Huang | |
| 2018/0105186 A1* | 4/2018 | Motomura | B60W 50/14 |

* cited by examiner

SYSTEM AND METHOD FOR AUTOMATICALLY ACTIVATING TURN INDICATORS IN A VEHICLE

CROSS-REFERENCE TO RELATED APPLICATIONS

This application is a continuation-in-part of U.S. patent application Ser. No. 15/700,390 filed on Sep. 11, 2017, now U.S. Pat. No. 10,173,586, which are incorporated by reference herein.

TECHNICAL FIELD

The present disclosure relates generally to auxiliary systems that facilitate the driving of a motor vehicle, more specifically, to systems and methods for automatically activating turn indicators of a motor vehicle.

BACKGROUND

The turn indicator of the vehicle is a stationary device with a flashing light, in which the flashing occurs due to intermittent supply of electric current to the lamp, intended to alert other drivers or users of the road of the intention of the driver to perform the maneuver associated with the turn (performing maneuvers) to the right or left. The turn indicators can also be used as an emergency alarm.

Before the beginning of the movement, performing maneuvers, turning (turning) and stopping, the driver is obliged to signal the direction indicators of the directions in question. Thus the signal should not deceive other drivers or pedestrians (for example, the driver should not active the turn signal when moving straight). The turn signal should be activated before beginning the maneuver and deactivated immediately after it is completed.

Turning the turn indicators on the vehicle is the responsibility of the driver. The driver is given the right and the opportunity to decide when to turn on the turn signal. Unfortunately, not all drivers perform this duty clearly, diligently and timely, which may create emergency situations on the road.

Accordingly, there is a need to facilitate automatic activation of the turn signals.

SUMMARY

The present disclosure relates to systems and methods for automatically activating turn signals of a motor vehicle. The technical result of the present disclosure is to provide an automatic assistance to the driver of the motor vehicle in performing a maneuver by determining whether the current traffic conditions are suitable for changing the direction of the vehicle based on the rules for detecting, determining and confirming a new direction of the car, and activating the car turn signals in accordance with the new direction of the car.

In one exemplary aspect, a methods for automatically activating turn signals of a motor vehicle, includes: collecting, for a predetermined period of time, from a plurality of internal and externals sensors of the vehicle, information associated with a plurality of driving maneuvers performed by a driver of the vehicle, the collected information includes at least one of information about driver's behavior, vehicle condition, road condition or traffic condition; feeding the collected information into a neural network for training a plurality of rules that determine when to automatically activate turn indicators based at least on driver's behavior; applying one or more trained rules to predict the next vehicle maneuver by the driver; and automatically activating a turn indicator of the vehicle based on the application of the one or more rules before the next vehicle maneuver is performed by the driver.

In one exemplary aspect, information about driver's behavior includes: a change in a driver's gaze in a side mirror of the motor vehicle, wherein the side mirror disposed on a side of the motor vehicle corresponding to the target direction.

In one exemplary aspect, information about driver's behavior includes: a change in a position of at least one hand of the driver on a steering wheel of the motor vehicle in a direction of rotation opposite to a direction of rotation of the steering wheel.

In one exemplary aspect, information about traffic condition includes: a distance between the first motor vehicle and an obstacle, wherein the obstacle is a second motor vehicle in a same lane as the first motor vehicle identified by the external sensor of the first motor vehicle; and a difference between the vehicle speed of the first motor vehicle and a vehicle speed of the second motor vehicle.

In one exemplary aspect, the method further comprises: converting the collected information for each performed maneuver into a vector; and feeding a plurality of created vectors into the neural network for training of rules.

In one exemplary aspect, the method further comprises: generating information about one or more additional maneuvers of the vehicle; and feeding the additional information into the neural network to fine tune the rules.

In one exemplary aspect, a system for automatically activating turn indicators of a motor vehicle comprises: an external sensor configured to detect an environment external to a motor vehicle; an internal sensor configured to detect a state of a driver operating the motor vehicle; and a hardware processor configured to: collect, for a predetermined period of time, from the internal and externals sensors of the vehicle, information associated with a plurality of driving maneuvers performed by a driver of the vehicle, the collected information includes at least one of information about driver's behavior, vehicle condition, road condition or traffic condition; feed the collected information into a neural network for training a plurality of rules that determine when to automatically activate turn indicators based at least on driver's behavior; apply one or more trained rules to predict the next vehicle maneuver by the driver; and automatically activate a turn indicator of the vehicle based on the application of the one or more rules before the next vehicle maneuver is performed by the driver.

In yet another exemplary aspect, a computer-readable medium is provided comprising instructions that comprises computer executable instructions for performing any of the methods disclosed herein.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method and computer program product for automatic activation of turn signals of a motor vehicle. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1A:
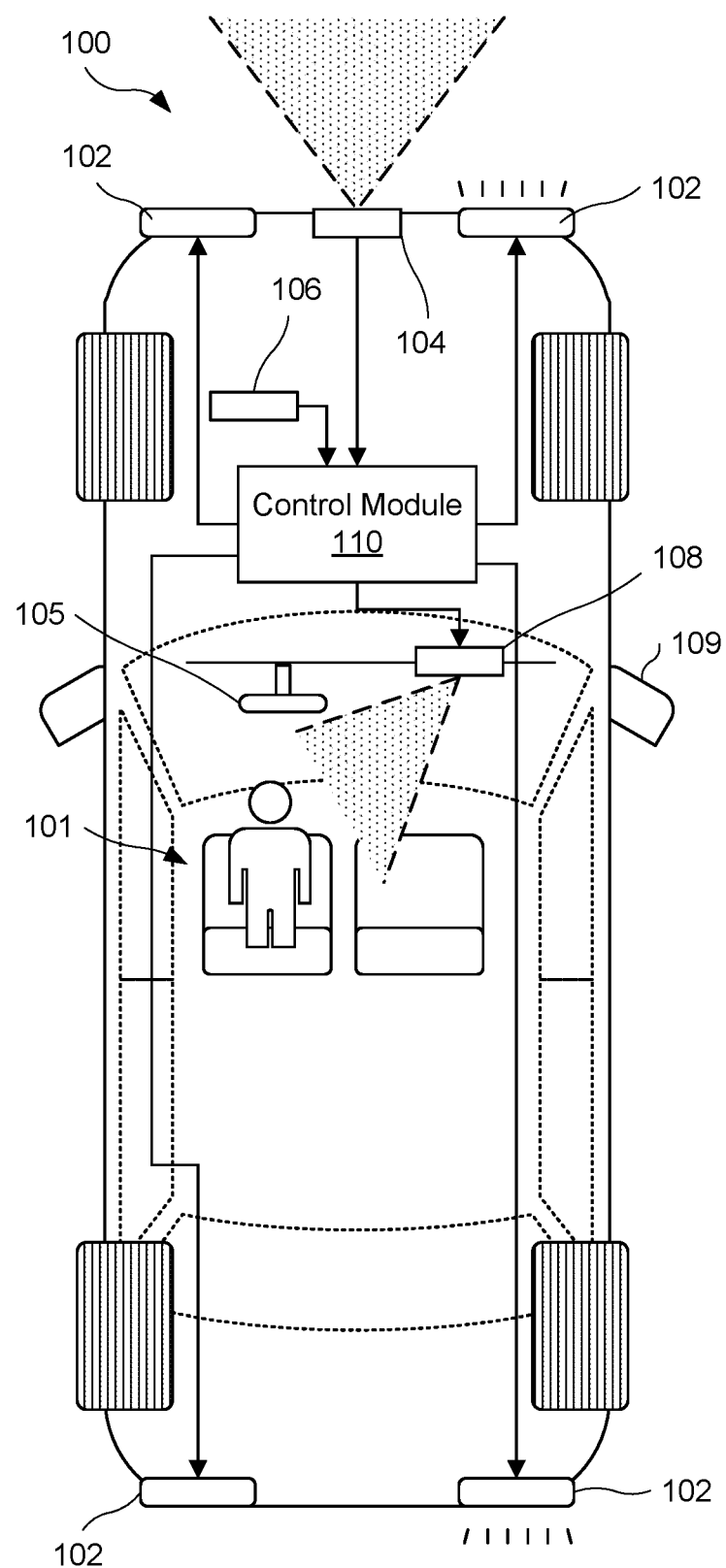
FIG. 1A is a block diagram depicting a top plan view of a motor vehicle having an automated turn indicator activation system according to aspects of the present disclosure.

FIG. 1A is a block diagram depicting a top plan view of a motor vehicle 100 having an automated turn indicator activation system according to aspects of the present disclosure. In the context of the present disclosure, motor vehicle's turn signal system is configured to provide automatic activation of a light signal that notifies other participants of the traffic (i.e., other drivers) that the driver of the car is about to maneuver. As used herein, a driving maneuver can refer to a variety of automobile movements, including a left turn, a right turn, a lane change, driving in a traffic circle, passing another vehicle, etc. While FIG. 1 depicts the motor vehicle 100 as an automobile (interchangeably referred to as a car), it is understood that aspects of the present disclosure may be used in other motor vehicles, such as tractor units, trucks, and motor cycles, as well as with transports units coupled to the motor vehicles, such as trailers, semi-trailers, and, hitches, which have a turn indicator system. It is further noted that aspects of the present disclosure are described assuming a right-hand traffic system (i.e., keep to the right side of the road), but aspects of the described technique may be extended equally to apply to a left-hand traffic systems (i.e., on the other side of the road).

The motor vehicle 100 may be operated by a driver 101 and includes a plurality of turn indicators 102 (also referred to as direction indicators, direction signals, and turn signals) configured to alert other drivers in traffic of the intention of the driver 101 to change the direction of the motor vehicle through one or more maneuvers (e.g., turns). The turn indicators 102 disposed on the driver side may be configured to activate together to signal a left turn, and on passenger-side to signal a right turn. Each turn indicator 102 may include a light unit (e.g., an array of LEDs) configured to illuminate in an intermittent manner when activated, or in other aspects, may be a plurality of light units (e.g., segmented light units). As shown in FIG. 1, the turn indicators 102 are disposed on exterior front and rear sides of the motor vehicle. It is noted that additional turn indicators 102 may be disposed at other locations on the motor vehicle, for example, on side mirrors 109 of the car, or on door panels of the car.

The motor vehicle 100 further includes a control module 110 coupled to a plurality of sensors and input devices of the car. Typically, a turn indicator system is manually activated by an upwards or downwards input from a stalk coupled to the instrument panel or steering column of the car interior. As described in greater detail below, the control module 110 is configured to automatically activate the turn indicators 102 based on the signals and sensor data received from the plurality of sensors and measuring devices. In some aspects, some data may be stored in the database 150 as sensor data 154 and used for training the control module 110.

The plurality of sensors may include one or more external sensors 104 configured to detect and generate sensor data about the environment external to the car, including information related to the road itself (e.g., lane detection), weather conditions, presence of other objects (e.g., distance to other cars, presence of road signs), and other information. In one aspect, the external sensors 104 may include a front-facing camera (e.g., coupled to a ceiling or a dashboard of the motor vehicle 100) configured to capture images and/or video data of the road, other vehicles on the road, road signage, etc. The external sensors 104 may include other cameras in different positions on the vehicle and of different range and functionality, such as an optical device coupled to a wearable head-mounted device (e.g., Google Glass®) worn by the driver 101, configured to capture provide images and/or video data to the control module 110 of the road, other vehicles on the road, road signage, etc. In some aspects, the external sensors 104 may include a light sensor configured to determine an illumination level of the environment external to the motor vehicle 100 (e.g., whether it is light or dark outside). In other aspects, the external sensors 104 may include a LIDAR system configured to measure distances to target objects surrounding the motor vehicle using pulsed laser light and based on a reflected pulse of that light measured by a sensor.

The plurality of sensors may further include one or more internal sensors 106 configured to detect and generate sensor data related to the state of the motor vehicle 100 itself. In some aspects, the internal sensors 106 may include a speedometer configured to detect the current speed of the motor vehicle 100 at any given time. In some aspects, the internal sensors 106 may further include a navigation device configured to receive geo-positional radio signals (e.g., from GPS satellites) and calculate the geographic position of the motor vehicle 100. It is noted that such geographic information may be used to further determine other information, such as the current traffic congestion of the car's location, or the current weather conditions at the car's location. In some aspects, one of the internal sensors 106 may detect when a turn indicator 102 has been manually activated by the driver (e.g., using a stalk) and generates event information indicating such (referred to herein as blinker events). In other aspects, one of the internal sensors 106 may detect when the steering wheel has been rotated (e.g., a threshold number of degrees) and generates event information indicating such (referred to herein as turn events).

The plurality of sensors may also include one or more "driver" sensors 108 configured to detect and generate sensor data related to information about the actions, behavior, and state of the driver 101 operating the motor vehicle 100. In one aspect, the driver sensors 108 may be configured to detect a gaze direction of the driver 101, i.e., the direction in which the driver 101 is looking. For example, the driver sensors 108 may include a driver-facing camera, for example mounted above or below a steering wheel 105, disposed on the ceiling or on the car's instrument panel. Such a driver-facing camera may be configured to record photo or video data that can be analyzed to extrapolate the gaze direction, for example, based on the head position of the driver 101, or based on movement in the driver's eyes. In another aspect, the gaze direction may be determined based on the video or photo data stream coming from the optical device of a wearable head-mounted device. In another aspect, the driver sensors 108 may be configured to determine a change in the position of the hands of the driver on the steering wheel 105. For example, the driver sensors 108 may include a camera device configured to record photo or video data of the steering wheel. In another example, the driver sensors 108 may include one or more proximity sensors disposed within the steering wheel that are configured to detect the presence and location of the driver's hands using capacitive touch sensing techniques.

Figure 1B:
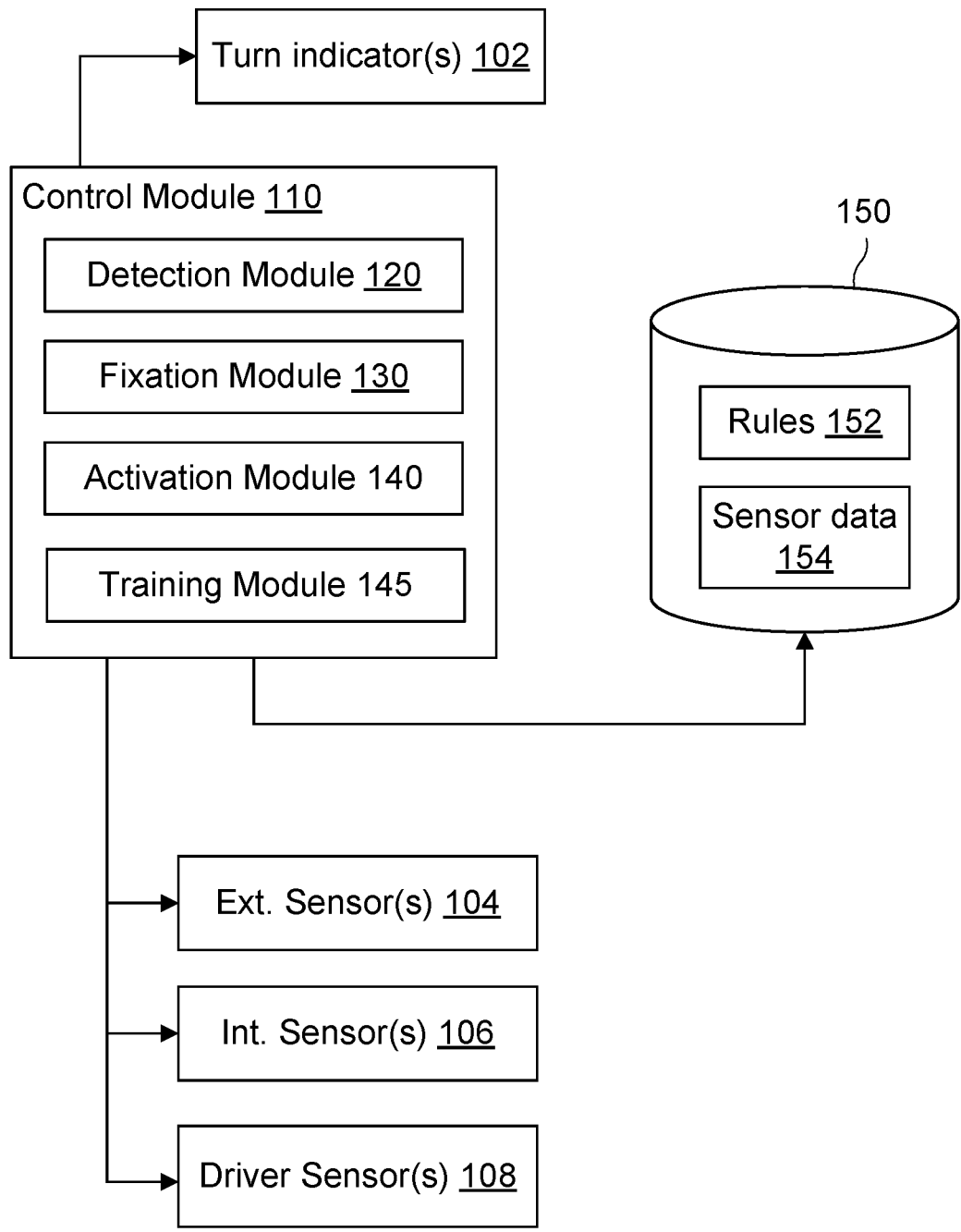
FIG. 1B is a block diagram representing a structural scheme of a system for automatically activating the motor vehicle's turn indicators.

FIG. 1B is a block diagram of an exemplary system for automatically activating the motor vehicle's turn indicators. The motor vehicle turn signal activation system includes the control module 110 having a detection module 120, a fixation module 130, an activation module 140, and a database 150 storing a plurality of activation rules 152.

In one aspect, the vehicle's turn signal activation system starts when the vehicle computer or an engine control unit (ECU) of the car is turned on and remains active continuously during its movement until the vehicle's on-board computer turns off. In another aspect, the system may be operated periodically, for example, when the automatic transmission is switched to the "D-drive" position ("start-up" rule). In yet another aspect, the system can start operation at a predetermined time, for example, 1 second after the start of the movement (changing the car's speed to something other than zero), or when a certain event or condition occurs, for example, detection of marking on the road.

The detection module 120 is configured to determine the current traffic conditions of the vehicle using one or more sensors 104, 106 of the motor vehicle. The current traffic conditions may include a set of parameters of the car's movement, transport-operational qualities of the road, traffic and conditions on the roads, weather conditions directly affecting the process of the car on the road. In one aspect, the detection module 120 may determine one or more traffic conditions including the current vehicle speed, the current traffic congestion, the current vehicle coordinates, the distance to the nearest obstacle in the lane, the distance to the nearest turn, any markings applied to the road, road signs along the road, a number of lanes on the left of the motor vehicle, the number of lanes on the right of the motor vehicle, the distance to the obstacle in the lane, the nearest lane on the left, the distance to the obstacle in the lane, the nearest lane on the right, an angle of the road gradient, a level of illumination around the motor vehicle, and current weather conditions. The detection module 120 may be configured to determine some traffic conditions as derived or calculated from other traffic conditions, for example, such as the average speed of the motor vehicle 100 for a given period of time, an average speed of the motor vehicle on the road section, a time before collision with identified obstacles in the lane without changing speed and direction of the motor vehicle, the time to enter an identified intersection, and so forth.

When determining the current traffic conditions, the detection module 120 takes into account the side of the road along which the vehicle is moving, namely, taking into account that the movement is both right-handed and left-handed. The detection module 120 with the help of instruments and devices installed in the car may also determine the following conditions: the current speed and acceleration of the car (which can be determined with the aid of a speedometer and/or accelerometer), the current traffic congestion (according to the built-in navigator), the illumination level (using a light sensor), and type of road cover, e.g., tarmac, asphalt or dirt road (using for example camera). Other conditions can be determined with additional devices and measuring devices, for example: LIDAR's, cameras of different range and functionality, sensors, external navigation devices receiving data from satellites, etc. LIDAR and GPS technologies can almost build virtual road for a user including number of obstacles, road signs, current traffic, speed and acceleration of cars nearby, number of lanes and how there are being occupied, road slope etc.

Yet another method of detecting traffic is a "connected car" technology. Such technology gives possibility to interchange data between cars and their systems including current invention. For example, if two cars using current invention and mutual data interchange will detect proposed intersection both systems will warn their drivers and only one system (based on current road situation and known traffic rules) will activate turn indicators afterall.

In one aspect, the detection module 120 is configured to detect, based on one or more detection rules 152, whether the current traffic conditions of the car 100 are suitable for changing the direction of the vehicle. Suitable conditions for the road to change the direction of the car are the current traffic conditions of the car 100 or calculated on the basis of current conditions that may precede a change in the direction of the car or be a sign of a subsequent change in the direction of the car. The database 150 is designed to store detection rules 152. Different database types can be used as the database 150 of rules 152, namely: hierarchical (IMS, TDMS, System 2000), network (Cerebrum, Cronospro, DBVist), relational (DB2, Informix, Microsoft SQL Server), object-oriented Jasmine, Versant, POET), object-relational (Oracle Database, PostgreSQL, FirstSQL/J), functional, etc. Updating databases can also be done using a server located on an external network (for example, on the Internet).

In one aspect, a detection rule 150 is a set of conditions in which, under each condition from the set, the current traffic conditions are suitable for changing the direction of the car. In general, the rules can be based on the mechanics of possible maneuvers. For example, the detection module 120 may determine the current traffic conditions are suitable for changing the direction of the motor vehicle based on a rule indicating a time to critical approach to an obstacle (e.g., a distance of 3 meters) is less than a certain time period (e.g., 15 seconds). In this case, for example, the car 100 is moving along a lane in which another car is moving in the same direction, but at a slower speed. Thus, to continue the movement, the control module 110 concludes it is necessary to perform a maneuver in the form of, for example, overtaking, in which it becomes necessary to activate the direction indicators to signal a lane change around the other car. The detection module 120 may calculate the time-to-critical-approach by dividing the distance between cars in the lane by the difference in current vehicle speeds.

In another example, the detection module 120 may determine the current traffic conditions are suitable for changing the direction of the motor vehicle based on a rule indicating a time to enter an identified T-intersection in less than a threshold time period (e.g., 15 seconds). The detection module 120 may calculate a time to enter the intersection by dividing the distance to an identified intersection by a current vehicle speed of the car 100. In this case, the car moves along the road, in which an intersection with another road is ahead. Thus, the control module 110 concludes that, if the driver is required to make a maneuver in the form of a turn at the nearest intersection, then before it is completed, turn indicators should be activated to signal a turn at the intersection.

In another example, the detection module 120 may determine the current traffic conditions are suitable for changing the direction of the motor vehicle based on a rule specifying a time to an identified road sign at a certain distance (e.g., 300 meters) in less than a threshold time period (e.g., 20 seconds) based on the content of the identified road sign (e.g., "No Entry"). In this case, the car moves along the road, which is 300 meters away is located a crossroads on which traffic in the former direction is prohibited. Thus, the control module 110 concludes that the motor vehicle will need to make a maneuver in the form of a turn at the nearest intersection, and before it is completed, turn indicators should be activated.

In some aspects, the detection module 120 may use sensor data indicating that a driver has executed a turn maneuver to modify and/or reinforce detection rules 152. For example, the detection module 120 may determine that a turn indicator 102 should be activated based on a current traffic condition that is suitable for changing the direction of the motor vehicle according to a particular detection rule 152. If the detection module 120 then receives an indication (e.g., a turn event) that the driver has in fact executed the predicted maneuver (e.g., a lane change), the detection module 120 may use that turn event as feedback indicating the particular detection rule 152 is accurate. In some cases, the detection module 120 may use the turn event as feedback to modify and refine the detection rule 152 by modifying a threshold value within the rule. For example, responsive to detecting that current traffic conditions are suitable for a left-side lane change but failing to detect a subsequent turn event, the detection module 120 may reduce a threshold distance of 300 meters to, say, 250 meters. In other aspects, the detection module 120 may use the turn events as historical data to increase or decrease a weight of a given detection rule 152.

In one aspect, detection rules 152 may be created using AI techniques based on the data collected from cars using this system. Known methods of AI learning include: regression models (linear, logistic), SVM, artificial neural networks, clustering, and others. One example can include neural network with one hidden layer. Input layer can gather data from control module 110. Learning can be performed using data from sensors 104-108. An example of a method for training detection rules 152 for a particular driver using an artificial neural network will be described herein below.

In some aspects, the detection module 120 may use the turn events in conjunction with a lack of blinker events to increase a weight of a given detection rule 152. For example, the detection module 120 may determine that a turn indicator 102 should be activated based on a current traffic condition that is suitable for a right turn maneuver according to a particular detection rule 152. The detection module 120 then receives an indication (e.g., a turn event) that the driver has in fact executed the right turn maneuver, but failed to manually activate the right-side turn indicator. In this case, the detection module 120 may use the lack of a blinker event as feedback indicating the particular detection rule 152 should be more frequently be used to automatically activate the turn indicator 102 based on a conclusion that the driver is unlikely to manually use the blink themselves in that situation.

When detecting suitable conditions for changing the direction of the vehicle, the detection module 120 transmits the signal to the fixation module 130. Upon receiving a signal from the detection module 120, the fixation module 130 determines a new direction of the vehicle's movement based on a change in driver behavior using an internal sensor of the motor vehicle. The fixation module 130 may be configured to determine a new direction for the vehicle by detecting the safety checks performed by the driver 101 of the motor vehicle prior to actually performing any maneuver. For example, to perform maneuvers associated with leaving an occupied lane, the driver 101 is obliged to make sure that the maneuver does not interfere with other traffic participants. To do this, the driver might check the side mirrors, which involve looking at them. As such, the fixation module 130 may determine a new direction of the vehicle's movement by detecting a change in the gaze direction (e.g., turning of the driver's head and/or movement of the driver's eyes) in the side mirror toward a new direction of the car's movement prior to executing the turn maneuver.

Figure 2A:
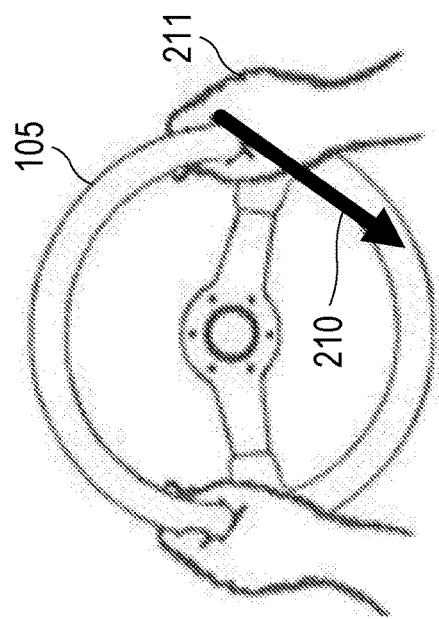
FIG. 2A depicts a scheme for detecting a change of gaze direction in connection with a left-turn maneuver.
Figure 2B:
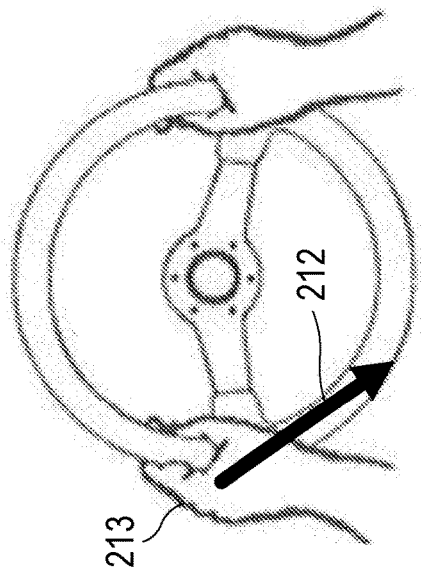
FIG. 2B depicts a scheme for detecting a change of gaze direction in connection with a right-turn maneuver.

FIG. 2A depicts a scheme for detecting a change of gaze direction in connection with a left-turn maneuver. In this case, the driver 101 looks in the left mirror 109. For example, a driver sensor 108 (for example, a front camera 204 mounted on the ceiling or car dashboard or a wearable-device having a front-facing camera communicatively connected to a fixation module 130, for example, Google glass) can be used to detect the driver's gaze direction via photographic images or using a video stream. In general, the fixation module 130 analyzes the sensor data (e.g., photos or video stream) and identifies a change in the driver's gaze direction, i.e., the direction in which the driver is looking (as represented by the arrows 201 and 202). In one aspect, the sensors connected to the fixation module 130 are also installed in the side mirrors, such as a side-view camera 206. In this case, the fixation module 130 analyzes the gaze direction in which the driver is looking and also determines whether the driver is looking in or out of the side mirror (for example, the driver's attention was attracted by an information board installed on the roadside). FIG. 2B depicts a similar scheme for detecting a change of gaze direction in connection with a right-turn maneuver. In this case, the driver 101 checks the right side mirror, which involves a change in the driver's gaze direction (arrow 203). In some aspects, to prevent over sampling of the internal sensors 106, the capture of digital imagery of the driver may be limited to situations only in response to the detection module 103 determining that there are suitable conditions for a maneuver.

In some aspects, the fixation module 130 may be configured to detect a change in gaze direction by estimating a head pose of the driver using image data received from at least one internal sensor 106 (e.g., camera). As used herein, head pose estimation refers to the ability to infer the orientation of the driver's head from digital imagery produced by the internal sensors 106. In some aspects, the fixation module 130 is configured to detect a change in gaze direction using techniques for eye tracking that analyze digital imagery of the driver's eyes, if available.

Figure 3A:
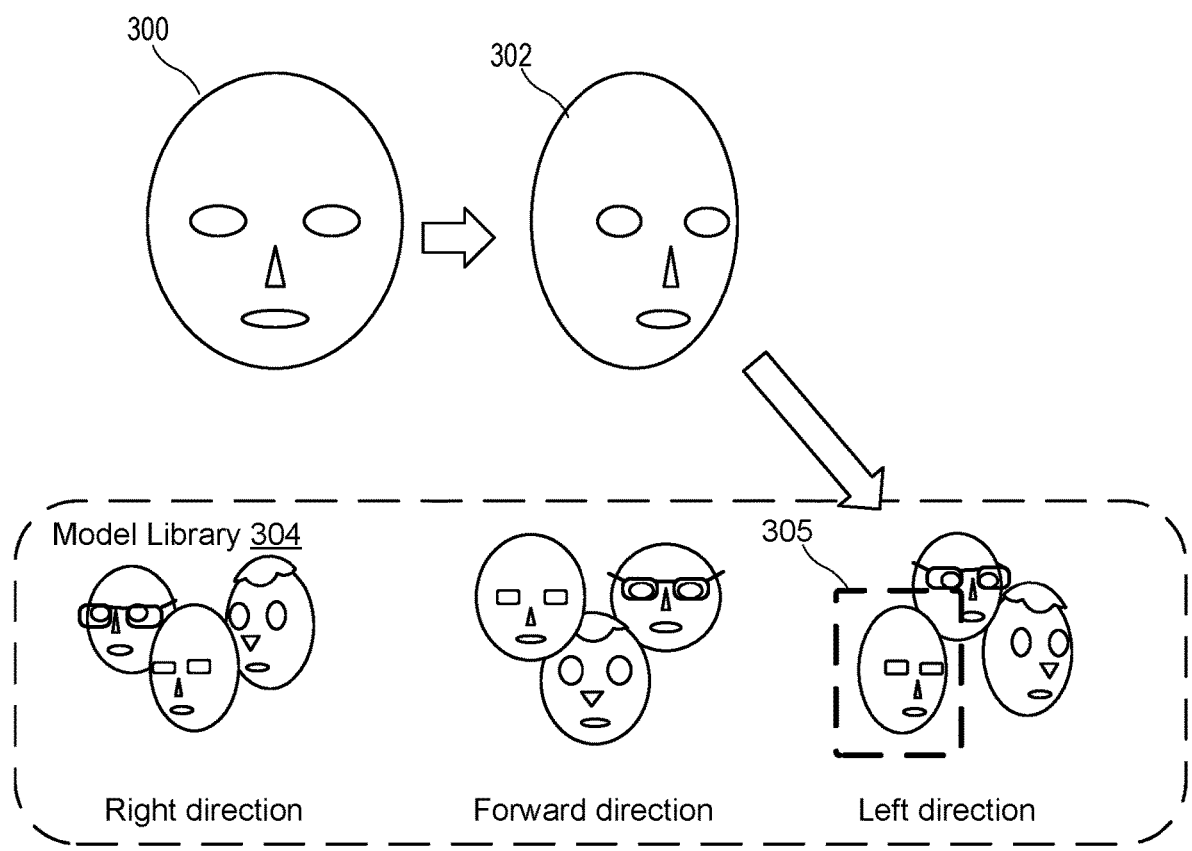
FIG. 3A depicts one scheme for determining gaze direction using head pose estimation according to an exemplary aspect.

FIG. 3A depicts one scheme for determining gaze direction using head pose estimation according to an exemplary aspect. The fixation module 130 may receive digital images 300, 302 of the driver's head from internal sensors 106 (such as cameras 204, 206), which may correspond to a change in the driver's gaze direction from forward (i.e., image 300) to the left (i.e., image 302). In one aspect, the fixation module 130 may use a template-based approach that uses image-based comparisons to match an image 302 of the driver's head with a set of model images from a model library 304 (e.g., stored in the database 150). The model images may have corresponding tags indicating a gaze direction, such as model images of heads oriented in the rightward direction, model images of heads oriented in a forward direction, and model images of heads oriented in the leftward direction (the terms "left" and "right" being used from the perspective of the motor vehicle). The fixation module 130 may use the image 302 as the subject of a query of the model library 304, which calculates image-based similarity scores and returns one or more results 305 having a similarity score exceeding a threshold value. The fixation module 130 may determine the new gaze direction based on the gaze direction of the tag associated with the returned result 205 (in this case, a left direction). A variety of image-based comparison techniques may be used, such as a mean squared error (MSE) calculation using a sliding window, a mean absolute deviation (MAD) calculation, or normalized cross-correlation with different image resolutions.

In some aspects, the image 302 may be added to the library 304 to build upon the library and improve subsequent image searches. In some aspects, the library 304 may be pre-loaded with the motor vehicle 100. In other aspects, the library 304 may be populated with images captured during a specialized training session, for example when the car is first turned on, in which the control module 110 instructs the driver to look in certain directions. In another aspect, the library 304 may be populated with images captured during periods of time in which the control module 110 may infer the direction the driver is looking through adjustment of the mirrors. For example, responsive to detecting the driver is adjusting the left side mirror (e.g., by actuation of a mirror adjust button), the control module 110 may conclude that the driver is likely looking in the left direction, then captures, tags, and stores such images within model library 304. Such images may be stored within the database 150 as previously-recorded sensor data 154.

Figure 3B:
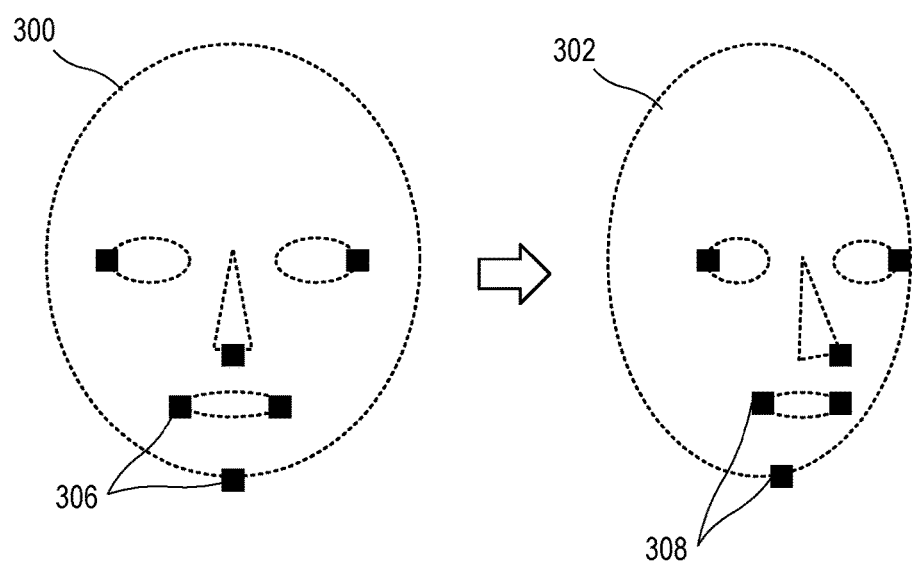
FIG. 3B depicts another scheme for determining gaze direction using head pose estimation according to an exemplary aspect.

FIG. 3B depicts another scheme for determining gaze direction using head pose estimation according to an exemplary aspect. In one aspect, the fixation module 130 may use a geometric approach for computer vision that relies on a plurality of points identified a digital image of the driver's head (also referred to as a perspective-N-point problem). As shown, the fixation module 130 may identify a plurality of points 306 on the digital image 300 associated with a first state, and a second plurality of points 308 on the digital image 302 associated with a second state (i.e., a possible change in gaze direction). In some aspects, the 3D points of the driver's head may include points corresponding to a tip of the driver's nose, a chin, a left corner of a left eye, a right corner of the right eye, a left corner of the mouth, and a right corner of the mouth, although other points may be used. The fixation module 130 may calculate 2D coordinates for the sets of points 306, 308, calculate corresponding 3D coordinates for the points 306, 308 as so-called world coordinates (also referred to as Model Coordinates), and then determine whether the difference between the sets of points corresponds to a degree and direction of rotation of the driver's head (i.e., indicative of a head turn). In some implementations, the fixation module 130 may use a computer vision library, such as OpenCV, and functions such as solvePnP( ) and solvePnPRansac( ), to estimate the head post based on the images 300, 302.

It is understood that other suitable computer vision techniques may be applied to the sensor data (e.g., digital images or video) received from the internal sensors 106. Also, while aspects of the present disclosure describe determining the gaze direction based on a head pose estimation, it is understood that such techniques may provide a course estimate of gaze direction, and that similar techniques may be applied to digital images of the driver's eyes to confirm or more clearly estimate the gaze direction of the driver.

Another method of detecting rotation of head is using recurrent neural networks for image recognition. Such model can be fed with data from driver 101 himself using cameras 204 or 206 with various lamination and aspect ratio.

In addition, the fixation module 130 is also configured to confirm the new direction of the vehicle by detecting changes in the position of the driver's hand on the steering wheel in anticipation or in preparation of performing the turning maneuver. In one aspect, the fixation module 130 detects changes in the position of the driver's hand on the steering wheel in the direction opposite to the direction of the steering wheel (e.g. clockwise or counterclockwise) providing a certain new direction of a car movement.

Figure 2C:
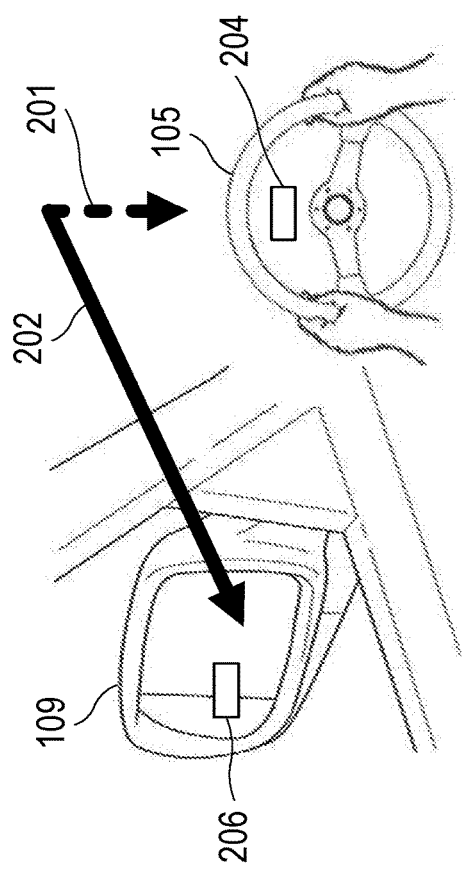
FIG. 2C depicts a scheme for detecting a change in a driver's hand positions in connection with a left-turn maneuver.
Figure 2D:
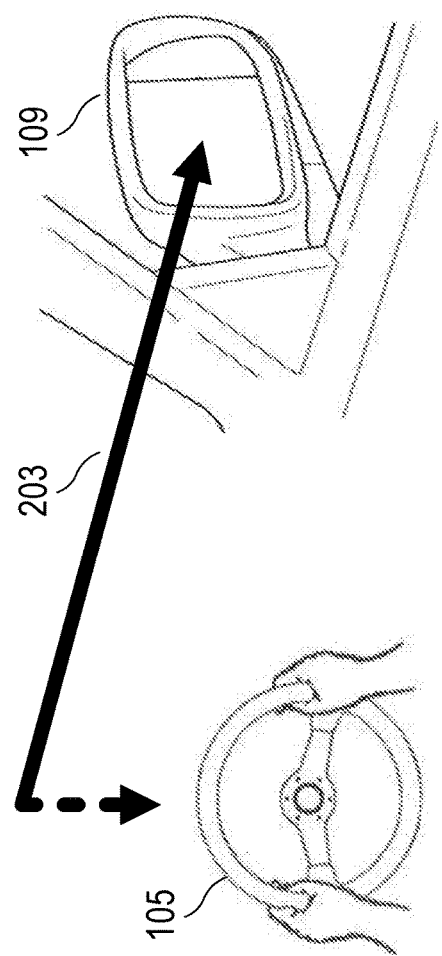
FIG. 2D depicts a scheme for detecting a change in a driver's hand positions in connection with a right-turn maneuver.

Referring back to FIG. 2C, this Figure depicts a scheme for detecting a change in a driver's hand positions in connection with a left-turn maneuver. In the example shown, the driver 101, in preparation for a left turn, changes the position of their right hand 211 to another position in a clockwise direction (as represented by arrow 210), to better exert torque on the steering wheel 105 in a counterclockwise direction corresponding to turning the motor vehicle to the left. FIG. 2D depicts a scheme for detecting a change in a driver's hand positions in connection with a right-turn maneuver. In the example shown, the driver 101, in preparation for a right turn, changes the position of their hand 212 to another position in a counterclockwise direction (arrow 213), for rotating the steering wheel 105 in a clockwise direction of rotation corresponding to turning the motor vehicle to the right.

In general, it has been determined that, when making a maneuver, for example, turning at 90 degrees, with a normal steering grip, the driver 101 does not need one half-turn of the steering wheel 105, which makes it possible to make a normal grip. Therefore, the driver 101 is forced to intercept in the direction opposite to the direction of rotation of the steering wheel, providing a new direction of the car, as shown in FIG. 2C and FIG. 2D, to increase the angle of rotation of the steering wheel. It should be borne in mind that the driver can change the position of not both hands, but only one hand. As such, the fixation module 130 may be configured to detect the change in position of one hand or both hands. Under normal conditions, a change in the position of the arms may occur simultaneously with the turn indicators. The detected position of the hands on the steering wheel may be small, for example, a few centimeters.

In some aspects, the fixation module 130 may use a detected change in the driver's hand grip on the steering wheel 105 to confirm a new direction for the vehicle. It has been determined that some driving techniques may include a push-and-pull technique (also referred to as a shuffle technique). To anticipate such a steering technique, the fixation module 130 may detect a loosening in the hand grip of the hand opposite to the turning direction using an internal sensor 106, for example a pressure sensor or capacitive sensor disposed within the steering wheel. For example, to detect a left turn, in which the driver pulls down their left hand disposed at a 10 o'clock position, the fixation module 130 may detect a relaxed grip by the right hand previously disposed at a 2 o'clock position of the steering wheel.

The fixation of the position of the driver's hands on the steering wheel can be detected by the fixation module 130 using another driver sensor 108, for example, an additional camera, mounted above or below the steering wheel (for example, on the ceiling or on the car's instrument panel).

In the event of a change in the position of the driver's hands on the steering wheel, the new direction of the car's movement is deemed to be confirmed. The fixation module 130 transmits the confirmed new direction of movement of the vehicle to the activation module 140.

Activation module 140 is configured to activate the car's direction indicators in accordance with the confirmed new direction of the car. The activation of the turn indicators can be made by a module of hardware, for example, the activation module 140, by closing a relay. The turn indicators can be switched off by the activation module 140, for example by opening the relay after the maneuver is completed. The completion of the maneuver can be determined by the activation module 140 on a steering wheel deflection sensor (e.g., the angle of the steering wheel deflection from the position providing the car's movement straight is less than 5 degrees).

An example of the operation of this system is described below. In general, it is preferable for the system to work continuously while the vehicle is in motion. The driver after switching the transmission lever from the neutral position, for example, to the "D" or "R" position, in most cases plans to start moving. The first maneuver, then, is an exit to the lane from the curb. In this case, the driver, by switching the transmission lever, activates the claimed system, which begins to determine the current traffic conditions using the detection module 120. Since the current speed is zero, the "start-of-travel" detection rule will trigger and the detection module 120 will give the signal to the fixation module 130. The fixation module 130 will wait for the driver to look in the side mirror according to the new direction of the car's movement. In the right-hand traffic organization, the driver is obliged to look at the left mirror, which will reveal the fixation module 130. After looking at the left mirror, the driver will move his hands along the steering wheel clockwise (to then turn the steering wheel to the left, that is, counterclockwise), which will register the fixation module 130. A look in the left mirror allows the described system to determine the new direction of the car's movement to the left. The clockwise change in position of the hands on the steering wheel allows to confirm the new direction of the car's movement—to the left. As a result, the activation module 140 activates the left turn signals of the vehicle.

Figure 4A:
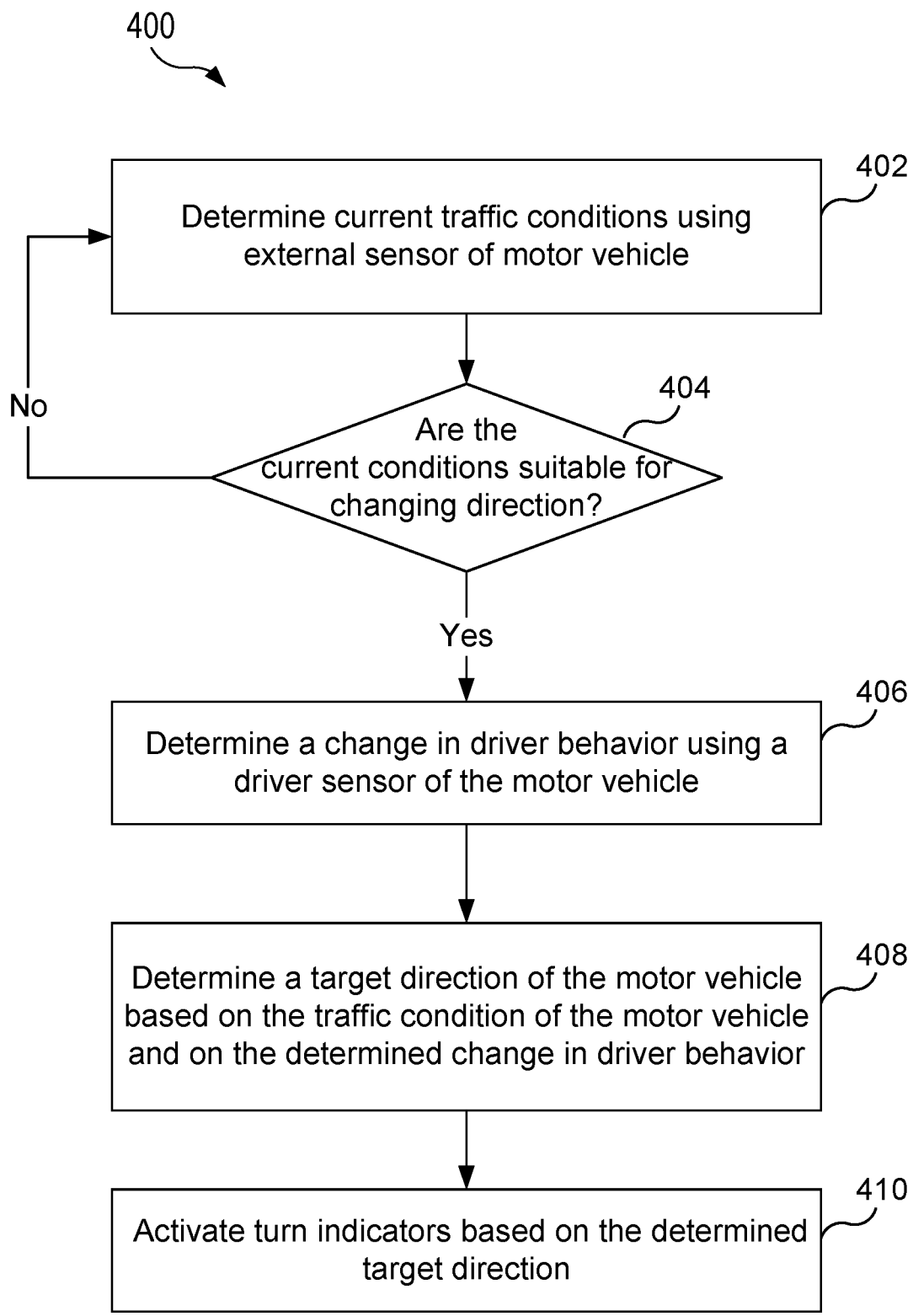
FIG. 4A is a flowchart illustrating a method for activating turn indicators of a motor vehicle according to an exemplary aspect.

FIG. 4A is a flowchart illustrating an exemplary method 400 for automatically activating turn indicators of a motor vehicle. It is noted that the following description of the exemplary method makes reference to the system and components described above.

The method 400 begins at step 402, the control module 110 determines a traffic condition of the motor vehicle using an external sensor 104 of the motor vehicle. In one aspect, the control module 110 may calculate a distance between the motor vehicle 100 and an obstacle identified by the external sensor 104 of the first motor vehicle, such as a (second) motor vehicle in a same lane as the motor vehicle 100, an intersection, or a road sign. In some aspects, the control module 110 may determine a current vehicle speed of the motor vehicle 100, as well as the current vehicle speeds of a second motor vehicle. In another aspect, the control module 110 may calculate a difference between the vehicle speeds of the motor vehicle 100 and the second motor vehicle. In some aspects, the control module 110 may divide the distance to the identified intersection by the determined current vehicle speed.

At step 404, the control module 110 determines whether the traffic condition of the motor vehicle is suitable for changing a direction of the motor vehicle. If so, at step 406, the control module 110 determines a change in driver behavior using a driver sensor 108 of the motor vehicle. In some aspects, the control module 110 may detect a change in a driver's gaze in a side mirror 109 of the motor vehicle disposed on a side of the motor vehicle corresponding to the target direction. In some aspects, the control module 110 may detect a change in a position of at least one hand of the driver on a steering wheel of the motor vehicle in a direction of rotation opposite to a direction of rotation of the steering wheel.

In one aspects, the control module 110 determines that the traffic condition of the motor vehicle is suitable for changing a direction of the motor vehicle is determined based on one or more database rules. For example, one rule of the database rules specifies a time to critical approach to an obstacle is less than a threshold time period. A second rule of the database rules may specify a time to enter to an identified intersection is less than a threshold time period. A third rule of the database rules may specify a time to an identified road sign at a first distance in less than a threshold time period based on a content of the identified road sign.

At step 408, the control module 110 determines a target direction of the motor vehicle based on the traffic condition of the motor vehicle and on the determined change in driver behavior. In some aspects, if appropriate conditions for changing the direction of the vehicle (as detected in step 404), the detection module 120 transmits a signal to the fixation module 130. Upon receipt of the signal, the fixation module 130 determines a new driving direction by detecting driver looking into the side view mirror in the direction of the new direction of travel. The fixation module 130 confirms the new direction of the vehicle by detecting changes in the position of the driver's hand on the steering wheel in the direction opposite to the direction of rotation of the steering wheel providing a certain new direction of travel and transmitting the confirmed new vehicle direction to the activation module 140.

At step 410, the control module 110 activates a turn indicator 102 of the motor vehicle 100 based on the determined target direction of the motor vehicle. For example, responsive to determining the target direction of the motor vehicle is "LEFT", the control module 110 activates the turn indicators 102 disposed on the left side of the motor vehicle. Similarly, the control module 110 may activate the right-side turn indicators of the car based on the target direction being a right turn.

According to one aspect of the present disclosure, the control module 110 may be configured to provide a warning mechanism that alerts the driver 101 when another vehicle or obstacle may be in the way of a predicted maneuver. Conventional blind spot monitors require the driver to manually signal a turn (e.g., via their turn indicators) before alerting the driver that there is an obstacle along the sides or rear of the vehicle. In contrast, in one aspect, the system for automatically activating turn indicators of a motor vehicle may alert the driver automatically based on a determination that current traffic conditions are suitable or not for changing direction of vehicle using the sensors 104, 106 of the vehicle for performing a maneuver and confirming the new direction based on behavior of the driver 101 (i.e., via internal sensors 108). For example, the control module 110 may determine that traffic conditions are suitable for a left lane change, confirm that left lane change based on a detected change in driver's gaze direction to the left, and then detect whether that there is a vehicle in the left blind spot of the motor vehicle 100. If another vehicle is detected in the driver's blind spot, the control module 110 may alert the driver, for example, through an audio beep, visual message, alert light, vibration or tactile indication (e.g., haptic feedback), or other messaging mechanisms that the intended maneuver is not advisable.

In another aspect, the system for activating turn indicators can operate in a training mode to learn the behavior of the current driver and to modify detection rules 120 to adapt better to the behavior of the driver and other conditions. In this case, the system (control module 110, modules 120-140) and sensors 104-108 may be activated in a learning mode at the very beginning. It means that automatic activation of turn indicators 102 won't be performed and rules 152 are empty or their parameters are unset. A training module 145 may be added to the control module 110, which receives data from sensors 104-108 and uses data from modules 120 and 130 to learn about driver's behavior, maneuvers and all preceding events. Training module 145 can be deployed on car (e.g., https://www.nvidia.com/en-us/self-driving-cars/drive-px/) or on server. Following data may be used by the training module: external data from sensor 104 (e.g., road conditions, traffic, other cars etc.), internal data from sensor 106 (e.g., driver's data) and data about maneuver itself (e.g., direction, speed, acceleration). Data about each maneuver may be gathered, vectorized and stored in database 150. Vectorized data is needed for future use in machine learning algotithms (learning phase). Output of such system will be rule 152 (for example—trained neural network). Rules 152 can be constantly reevaluated using new data from car and driver.

Figure 4B:
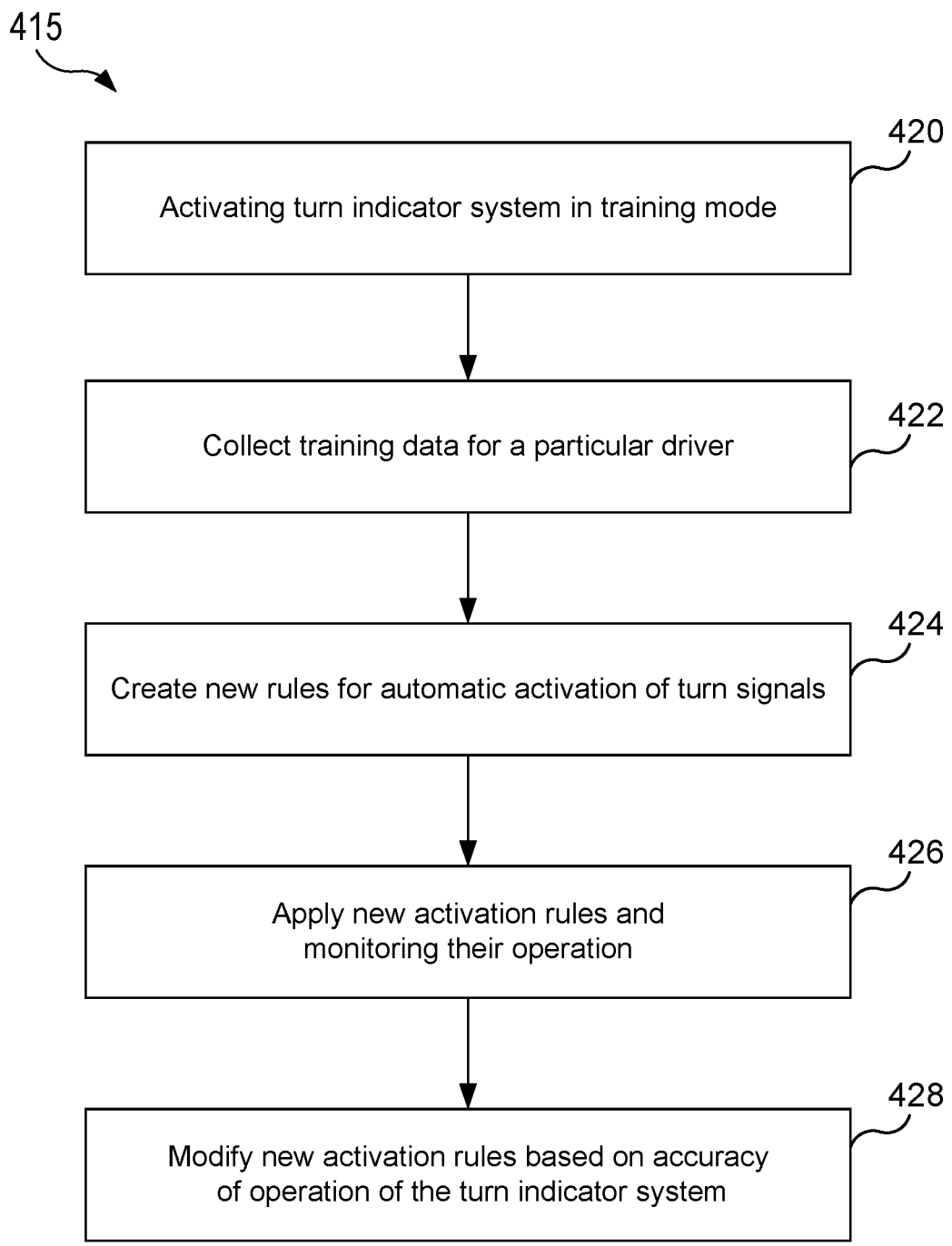
FIG. 4B is a flowchart illustrating a method for training the system for activating turn indicators for a particular driver of the motor vehicle according to an exemplary aspect.

FIG. 4B is a flowchart illustrating an exemplary method 415 for training the system for activating turn indicators for a particular driver. It is noted that the following description of the exemplary method makes reference to the system and components described above.

In step 420, the turn indicator system, namely the control module 110 (including the modules 120, 130, 140) and the sensors 104, 106, 108 are activated in a training mode. This means that there is no automatic activation of the turn indicators 102, and there are no activation rules 152, or they do not have the specified conditions. As explained above, the training module 145 is added to the control module 110, which receives data from the sensors 104, 106, 108 and uses the information from the modules 120 and 130 to issue a verdict on events (such traffic information, road conditions and road sign data, behavior of the driver, etc.) before the start of maneuver. In another aspect, the training module 145 may be implemented as an external computing device (e.g., server or mobile app) to which data is transmitted from the vehicle 100.

In step 422, the training module 145 collects data for a predetermined time (e.g., 2 hours) on how the particular driver 101 maneuvers the car and in what situations. The following information may be collected: data from external sensors 104 on the status of roads, traffic conditions, etc. and associated with this data from the detection module 120; data from the internal sensors 106 on the driver's condition and the operation of the fixation module 130; and data on the maneuver performed (in which direction, with what speed and acceleration the car was moving 100).

After the maneuver was completed, information on the next maneuver begins to be collected. Further, the information obtained for each maneuver is converted into a vector that is also stored in the database 150. In one aspect, when the training module 145 is executed as an external computing device, the stored vectors are transmitted to the external computing device.

At block 424, new detection rules 152 are created based on the collected data. To create rules, an artificial neural network can be used, into which the received data vectors are fed. The data should be of the same type, i.e. vectors should be similar to each other, that learning the neural network was most effective. A working rule (or set of rules) represents a trained neural network.

In step 426, the received new rules 152 are used to operate the control module 110 (in particular, the activation module 140) for automatically activating the turn signals 102.

At step 428, the efficiency and accuracy of the new rules 152 is monitored. For example, if the turn indicators 102 are not activated for all maneuvers of the vehicle 100, additional information is collected that will be used to further improve the working neural network (and accordingly fine tune rules 152), which is essentially repetition of steps 422-426.

Thus, the method described in FIG. 1B allows not only to automatically turn on the direction indicators 102, but also to train the turn signal activation system to a specific driver.

Figure 5:
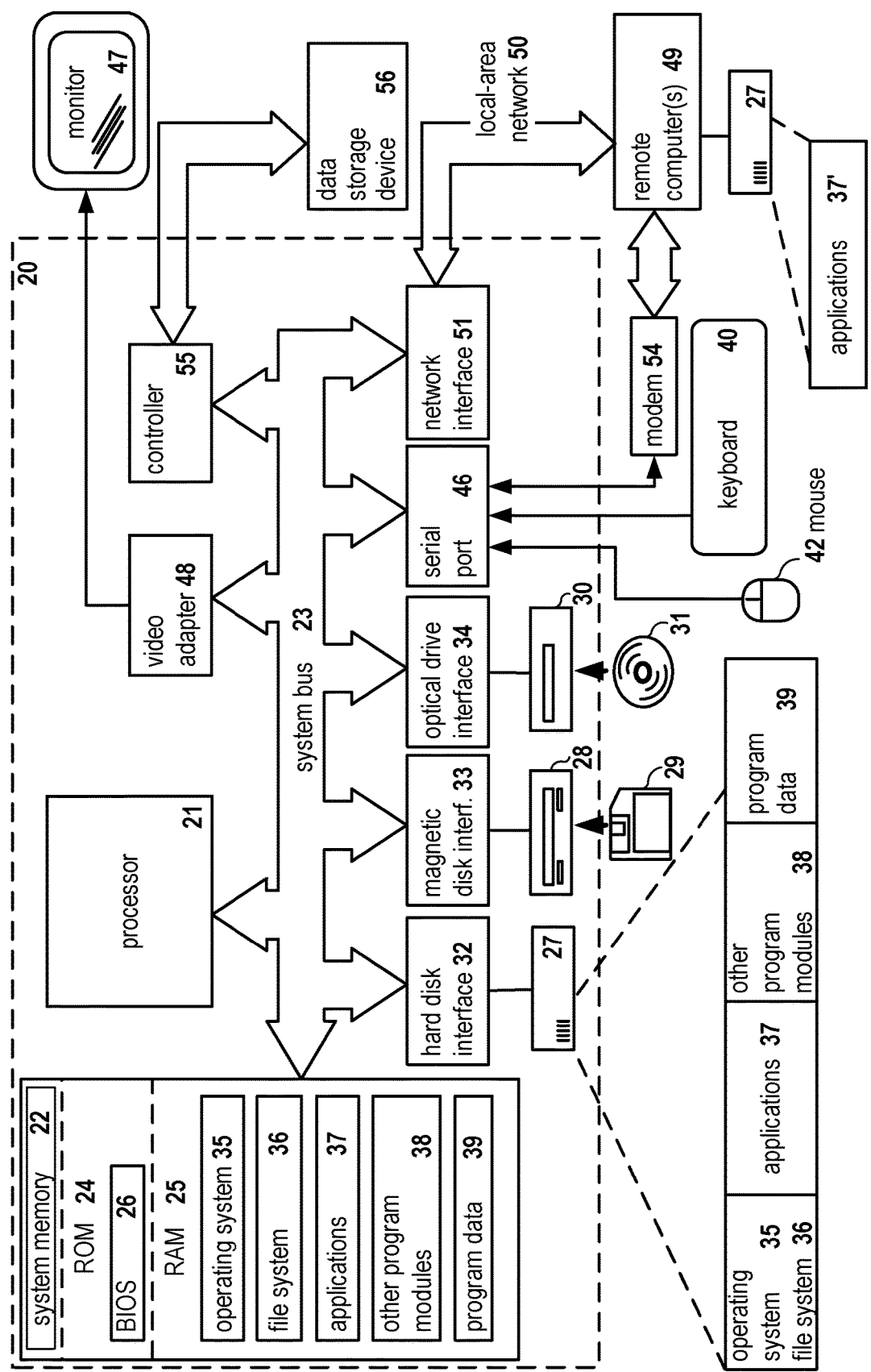
FIG. 5 is a block diagram of a general-purpose computer system on which the disclosed system and method can be implemented according to an exemplary aspect.

FIG. 5 is a block diagram illustrating an example of a computer system 20 on which aspects of systems and methods for automatically activating turn indicators of a motor vehicle may be implemented. It should be noted that the computer system 20 can correspond to an automobile control system configured to execute the control module 110, for example, described earlier.

As shown, the computer system 20 (which may be a general-purpose computer system) includes a central processing unit 21, a system memory 22, and a system bus 23 connecting the various system components, including plurality of sensors and measuring devices of the vehicle 100. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48.

Computer system 20 may operate in a wireless network environment, using a network connection to one or more remote computers 49 or user devices (e.g., driver's smart phone). The computer system 20 may employ a cellular or wireless modem 54 or other modules well known to those of ordinary skill in the art that enable communications with a wireless or cellular network.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 5, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for automatically activating turn indicators of a motor vehicle, comprising:
   collecting, for a predetermined period of time, from a plurality of internal and external sensors of the motor vehicle, information associated with a first plurality of driving maneuvers performed by a driver of the motor vehicle, the collected information includes at least one of information about driver's behavior, vehicle condition, road condition or traffic condition;
   feeding the collected information into a neural network that selects, from a plurality of rules that determine whether a turn indicators should be activated, a rule that corresponds to the collected information, wherein each respective rule from the plurality of rules is associated with a respective weight used for determining automatic activation of the turn indicator;
   in response to determining that the rule indicates that the turn indicator should be activated and that the driver completed a turn maneuver without activating the turn indicator:
   (1) increasing a weight associated with the rule; and
   (2) prior to a subsequent turn maneuver for which the rule is again selected by neural network, automatically activating the turn indicator of the motor vehicle based on the increased weight.

2. The method of claim 1, wherein information about driver's behavior includes:

a change in a driver's gaze in a side mirror of the motor vehicle, wherein the side mirror disposed on a side of the motor vehicle corresponding to a target direction.

3. The method of claim 1, wherein information about driver's behavior includes:
a change in a position of at least one hand of the driver on a steering wheel of the motor vehicle in a direction of rotation opposite to a direction of rotation of the steering wheel.

4. The method of claim 1, wherein the vehicle is a first motor vehicle and wherein information about traffic condition includes:
a distance between the first motor vehicle and an obstacle, wherein the obstacle is a second motor vehicle in a same lane as the first motor vehicle identified by the external sensor of the first motor vehicle; and
a difference between a vehicle speed of the first motor vehicle and a vehicle speed of the second motor vehicle.

5. The method of claim 1, further comprising:
converting the collected information for each performed maneuver into a vector; and
feeding a plurality of created vectors into the neural network for selection of rules.

6. The method of claim 1, wherein the motor vehicle is a first motor vehicle, further comprising:
exchanging the collected information with a second motor vehicle; and
in response to receiving, an indication from the second motor vehicle, that the second motor vehicle will perform the turn maneuver, not automatically activating the turn indicator at the first motor vehicle.

7. A system for automatically activating turn indicators of a motor vehicle, comprising:
an external sensor configured to detect an environment external to the motor vehicle;
an internal sensor configured to detect a state of a driver operating the motor vehicle; and
a hardware processor configured to:
collect, for a predetermined period of time, from the internal and external sensors of the motor vehicle, information associated with a plurality of driving maneuvers performed by the driver of the motor vehicle, the collected information includes at least one of information about driver's behavior, vehicle condition, road condition or traffic condition;
feed the collected information into a neural network that selects, from a plurality of rules that determine whether a turn indicator should be activated, a rule that corresponds to the collected information, wherein each respective rule from the plurality of rules is associated with a respective weight used for determining automatic activation of the turn indicator; and
in response to determining that the rule indicates that the turn indicator should be activated and that the driver completed a turn maneuver without activating the turn indicator:
(1) increase a weight associated with the rule; and
(2) prior to a subsequent turn maneuver for which the rule is again selected by neural network, automatically activate the turn indicator of the motor vehicle based on the increased weight.

8. The system of claim 7, wherein information about driver's behavior includes:
a change in a driver's gaze in a side mirror of the motor vehicle, wherein the side mirror disposed on a side of the motor vehicle corresponding to a target direction.

9. The system of claim 7, wherein information about driver's behavior includes:
a change in a position of at least one hand of the driver on a steering wheel of the motor vehicle in a direction of rotation opposite to a direction of rotation of the steering wheel.

10. The system of claim 7, wherein the vehicle is a first motor vehicle and wherein information about traffic condition includes:
a distance between the first motor vehicle and an obstacle, wherein the obstacle is a second motor vehicle in a same lane as the first motor vehicle identified by the external sensor of the first motor vehicle; and
a difference between a vehicle speed of the first motor vehicle and a vehicle speed of the second motor vehicle.

11. The system of claim 7, wherein the processor further configured to:
convert the collected information for each performed maneuver into a vector; and
feed a plurality of created vectors into the neural network for selection of rules.

12. The system of claim 7, wherein the motor vehicle is a first motor vehicle, and wherein the hardware processor is further configured to:
exchange the collected information with a second motor vehicle; and
in response to receiving, an indication from the second motor vehicle, that the second motor vehicle will perform the turn maneuver, not automatically activate the turn indicator at the first motor vehicle.

13. A non-transitory computer readable medium comprising computer executable instructions for automatically activating turn indicators of a motor vehicle, including instructions for:
collecting, for a predetermined period of time, from a plurality of internal and external sensors of the motor vehicle, information associated with a plurality of driving maneuvers performed by a driver of the motor vehicle, the collected information includes at least one of information about driver's behavior, vehicle condition, road condition or traffic condition;
feeding the collected information into a neural network that selects, from a plurality of rules that determine whether a turn indicators should be activated, a rule that corresponds to the collected information, wherein each respective rule from the plurality of rules is associated with a respective weight used for determining automatic activation of the turn indicator; and
in response to determining that the rule indicates that the turn indicator should be activated and that the driver completed a turn maneuver without activating the turn indicator:
(1) increasing a weight associated with the rule; and
(2) prior to a subsequent turn maneuver for which the rule is again selected by neural network, automatically activating the turn indicator of the motor vehicle based on the increased weight.

14. The non-transitory computer readable medium of claim 13, wherein information about driver's behavior includes:
a change in a driver's gaze in a side mirror of the motor vehicle, wherein the side mirror disposed on a side of the motor vehicle corresponding to a target direction.

15. The non-transitory computer readable medium of claim 13, wherein information about driver's behavior includes:
  a change in a position of at least one hand of the driver on a steering wheel of the motor vehicle in a direction of rotation opposite to a direction of rotation of the steering wheel.

16. The non-transitory computer readable medium of claim 13, wherein the vehicle is a first motor vehicle wherein information about traffic condition includes:
  a distance between the first motor vehicle and an obstacle, wherein the obstacle is a second motor vehicle in a same lane as the first motor vehicle identified by the external sensor of the first motor vehicle; and
  a difference between a vehicle speed of the first motor vehicle and a vehicle speed of the second motor vehicle.

17. The non-transitory computer readable medium of claim 13, further comprising instructions for:
  converting the collected information for each performed maneuver into a vector; and
  feeding a plurality of created vectors into the neural network for selection of rules.

18. The non-transitory computer readable medium of claim 13, wherein the motor vehicle is a first motor vehicle, further comprising instructions for:
  exchanging the collected information with a second motor vehicle; and
  in response to receiving, an indication from the second motor vehicle, that the second motor vehicle will perform the turn maneuver, not automatically activating the turn indicator at the first motor vehicle.

* * * * *